April 25, 1961   H. E. HANSEN   2,981,397
MOVING STAIRWAY
Filed Sept. 13, 1957   7 Sheets-Sheet 1

April 25, 1961 H. E. HANSEN 2,981,397
MOVING STAIRWAY
Filed Sept. 13, 1957 7 Sheets-Sheet 2

H. E. HANSEN 2,981,397

MOVING STAIRWAY

Filed Sept. 13, 1957

April 25, 1961 H. E. HANSEN 2,981,397
MOVING STAIRWAY
Filed Sept. 13, 1957 7 Sheets-Sheet 5

April 25, 1961   H. E. HANSEN   2,981,397
MOVING STAIRWAY

Filed Sept. 13, 1957   7 Sheets-Sheet 7

United States Patent Office 2,981,397
Patented Apr. 25, 1961

2,981,397

MOVING STAIRWAY

Hans E. Hansen, Staten Island, N.Y., assignor to Westinghouse Electric Corporation, East Pittsburgh, Pa., a corporation of Pennsylvania Filed Sept. 13, 1957, Ser. No. 683,773

49 Claims. (Cl. 198—16)

This invention relates to moving stairways and in particular to moving stairway steps.

Each step of the moving stairway is generally provided with a riser and with a tread having a plurality of cleats extending in the direction of stairway travel. In the past there has been the danger of injury both to persons and to property as a result of objects entering and being caught in the space between the end of a step tread and the riser of the adjacent step when there is relative movement between adjacent steps, i.e., during the transition of steps between step and platform formation. The same dangers have existed with respect to the space between the sides of the steps and the stairway skirt guards during vertical travel of the stairway. Steps constructed in accordance with the invention greatly minimize the possibility of accidents occurring due to the aforementioned dangers.

In accordance with one embodiment of the invention, each step is furnished with tread cleat comb fingers which intermesh with riser cleats of the adjacent step in both platform and step formation and during the transition between platform and step formation. The tops of the riser cleats of each step end at and curve into the bottoms of the tread grooves with which they are aligned. Mounting means for the tread cleat comb fingers of each step preferably permit limited relative movement between the tread cleat comb fingers and the remainder of the step tread. Desirably the comb fingers for each step may be constructed as a separate unit which is suitably secured to the main tread portion of the associated step. The unit may be of material substantially free of friction relative to the risers.

The invention further contemplates that the ends of the tread cleats of each step immediately adjacent the stairway skirt guards may extend into recesses in the face of the riser of the successive step when the stairway steps are in both step and platform formation and during the transition between step and platform formation.

The tread cleats of each step immediately adjacent each stairway skirt guard may be fabricated of resilient material. Each cleat of resilient material preferably has a higher coefficient of friction than that of the adjacent stairway parts.

The tread cleats of each step may be supplied with movable ends which act to close the gap between the tread cleats and the riser of the adjacent step when a force is applied to the top surface of the movable ends. In the absence of such force the movable ends are biased to maintain the gap between the cleats of each step in the riser of the adjacent step.

Conveniently, a step of unitary construction may be provided, wherein each step has an integral riser and tread. The step wheel axle supports may also be integral with the riser and the tread. Relatively wide steps may be constructed of a plurality of sections of such unitary construction. Each step wheel axle is isolated from direct contact with each of its supports by a resilient bushing lying entirely within the aperture in each step support through which a wheel axle passes.

It is, therefore, an object of the invention to provide a moving stairway step having improved construction and safety features.

It is a further object of the invention to provide a moving stairway step having tread cleats and having riser cleats aligned with the grooves between the tread cleats, the riser cleats having tapered ends adjacent the tread grooves.

Another object of the invention is to provide a moving stairway step having tread cleats and having comb fingers constituting extensions of the tread cleats, the comb fingers being embodied in a unit which is separably secured to the portion of the step having the tread cleats, the unit being mounted for a limited movement relative to the tread cleats.

It is still another object of the invention to provide a moving stairway step having tread cleats and having comb fingers constituting extensions of the tread cleats, the comb fingers being embodied in a unit which is of material substantially free of friction relative to the step riser.

It is an additional object of the invention to provide a moving stairway step having tread cleats and grooves therebetween and having comb fingers constituting extensions of those tread cleats immediately adjacent the stairway skirt guards, the comb fingers projecting into recesses in the face of the riser of the adjacent step, each recess having a minimum width of substantially the width of one tread cleat plus that of one tread groove.

It is a further object of the invention to provide a moving stairway step having tread cleats and having comb fingers constituting extensions of those tread cleats immediately adjacent the stairway skirt guards, the comb fingers extending beyond any other part of the step tread at that end of the tread adjacent the riser of the next step.

Another object of the invention is to provide a moving stairway step having edges adjacent three other stairway parts, at least one edge being movable to close the gap between it and one of the adjacent stairway parts.

It is also an object of the invention to provide a moving stairway step having resilient tread cleats immediately adjacent the stairway skirt guards.

It is still another object of the invention to provide a moving stairway step having resilient tread cleats immediately adjacent the stairway skirt guards, the tread cleats having a higher coefficient of friction than that of adjacent stairway parts.

It is an additional object of the invention to provide the tread cleats of a moving stairway step with ends movable to close the gap between the end of the step tread and the riser of the adjacent step.

It is a further object of the invention to provide an improved moving stairway step of unitary construction having integral riser parts, tread parts and wheel axle supports.

It is still a further object of the invention to provide a moving stairway step having resilient means disposed substantially within the step wheel axle supports for isolating the step wheel axles from their supports.

Other objects of the invention will be apparent from the following description taken in conjunction with the accompanying drawings, in which.

Figure 1:
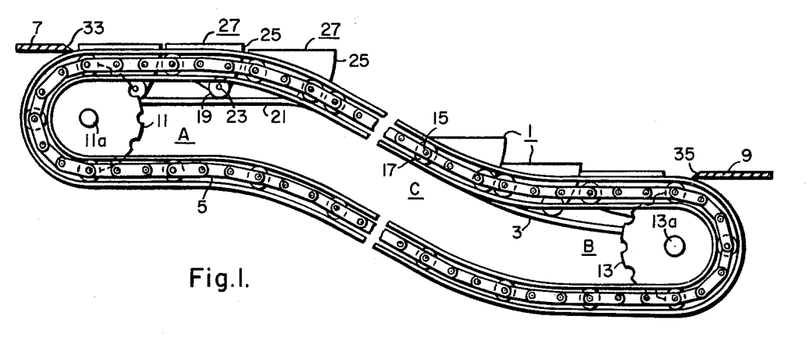
Figure 1 is a view in side elevation, with parts broken away and parts omitted, of a moving stairway embodying the invention.

Referring to the drawings, Fig. 1 shows a moving stairway comprising an endless series of movable steps 1 disposed to be moved along a track 3 by a sprocket chain 5 between an upper landing 7 and a lower landing 9. The sprocket chain 5 is supported at the upper landing by a sprocket wheel 11 and at the lower landing by a sprocket wheel 13. The sprocket wheels 11 and 13 are secured respectively to shafts 11a and 13a, which are mounted for rotation about their axes. In conventional practice, a suitable truss is provided for supporting the bearings of the shafts 11a and 13a. Since such a truss is well-known in the art, it appears unnecessary to describe or illustrate it. At equally spaced intervals the chain 5 carries axles 15 for pivotally supporting the steps 1. For moving the steps the upper sprocket 11 may have a driving motor, not shown, associated therewith. Each axle 15 carries a wheel 17 which is mounted for rotation with respect to the associated axle and which is guided in a predetermined path by means of the track 3.

The track 3 comprises an upper track assembly A, a lower track assembly B and a straight track assembly or portion C. The straight portion C usually is inclined at an angle relative to the horizontal of the order of 30°. Each track assembly includes track parts which are not illustrated in Fig. 1.

Each step 1 also includes a wheel 19 disposed on an axle 23 which cooperates with additional tracks, represented by the track 21 in Fig. 1, for further guiding the steps. The wheels 17 and 19 of a step are spaced in the direction of travel of the associated step. At the opposite ends of the steps there are similar arrangements of step wheels, tracks and sprocket wheels, corresponding to those heretofore described.

Further details of construction of moving stairways representative of that thus far described are shown in Dunlop Patents 2,109,210 and 2,231,709.

Referring now to Figs. 2, 3, 4, and 5, each step comprises a riser 25 and a tread 27 secured to a yoke 28. Preferably the riser 25 and the yoke 28 are integral construction. Each tread 27 is provided with a plurality of cleats 29, extending in the direction of stairway travel, and grooves 31 therebetween, for meshing with the teeth of combs 33 and 35 at landings 7 and 9 respectively, as is shown in greater detail in Dunlop Patent 2,109,210. The tread cleats 29 of each step are aligned with those of each of the other steps. The riser 25 of each step has vertically extending cleats 37 and grooves 39 therebetween. The center lines of the riser cleats 37 and the riser grooves 39 are aligned with the center lines of the tread grooves 31 and the tread cleats 29, respectively. The riser cleats 37 extend from the bottom 38 of the riser 25 to the bottoms of the tread grooves 31, each riser cleat having a smoothly curved end 43 adjacent the tread groove with which it is aligned, as is clearly shown in Fig. 5. This curved end 43 prevents injury in the event that a passenger falls and strikes the riser end of a step. The riser grooves 39 extend from the bottom 38 of the riser 25 to the bottoms of the tread cleats 29, the riser ends 41 of the tread cleats 29 terminating at the bottoms of the riser grooves 39.

That end of the tread of each step adjacent the riser 25 of the next step is provided with comb fingers 45 and recesses 47 therebetween, constituting extensions of the tread cleats 29 and the tread grooves 31, respectively, of the thread 27 of the same step. The comb fingers 45 extend into the oppositely disposed grooves 39 in the face of the riser 25 of the adjacent step when the stairway steps are in both platform and step formation and during the transition between platform and step formation, as is clearly shown in Fig. 5.

The tread comb fingers 45 may be an integral part of the step tread 27, but preferably they are detachable therefrom. In the latter case, the comb fingers may be part of an assembly 48 which is suitably mounted on the main part of the step. Thus the assembly 48 may have a tongue 49 which is slidably inserted into a horizontal groove 51 disposed in the steps beneath the tread grooves 31 and extending the width of tread. The comb finger assembly 48 is secured to the tread 27 by means of screws 53 inserted through apertures in the tread and apertures 50 in the tongue 49, the screws 53 being secured to the tread by means of nuts 54. Although the assembly 48 may be rigidly mounted on the remainder of the step, preferably a limited movement is provided therefor, as follows. Surrounding each screw 53 within the aperture 50 is resilient means in the form of a bushing 55 of a suitable elastomer such as rubber. This means of mounting the comb finger assembly 48 permits limited relative sideways movement between the comb finger assembly and the remainder of the step tread in order to compensate for any misalignment between steps and to prevent excessive friction between and wear of the intermeshing tread comb fingers and riser cleats, if the comb fingers for any reason should bear against the sides of the riser cleats. To minimize such friction and wear, the tread comb fingers may be fabricated of a self-lubricating material such as nylon, which will also have ample strength. Conveniently, the entire assembly 48 may be constructed of the same material molded or cast as a unit. The treads and their cleats may be constructed of any suitable material such as aluminum.

Figure 2:
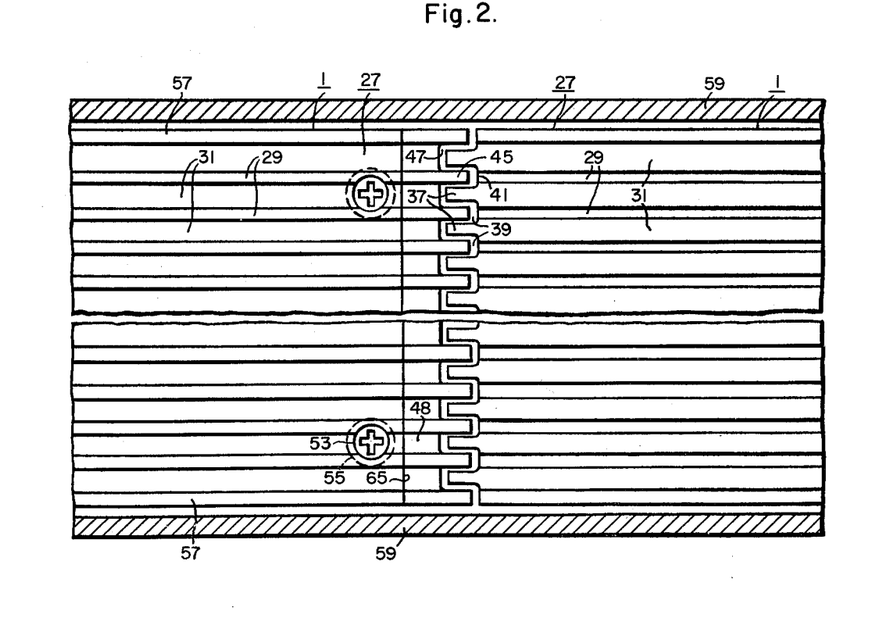
Fig. 2 is an enlarged top plan view, with parts broken away and parts omitted, of two of the steps shown in Fig. 1, with portions of the adjacent stairway skirt guards added in section.
Figure 3:
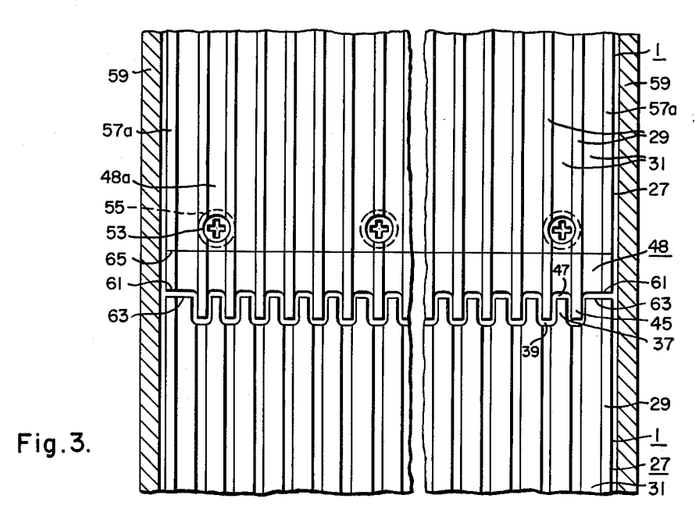
Fig. 3 is an enlarged top plan view, with portions broken away and parts omitted, of the two stairway skirt guards in section and a modified form of the two steps shown in Fig. 2.
Figure 4:
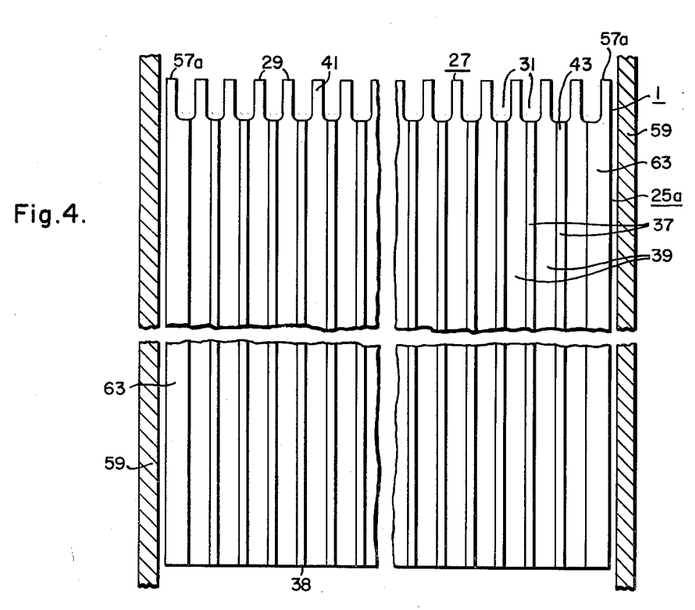
Fig. 4 is a view in front elevation with portions broken away of the riser of one of the steps shown in Fig. 3 with portions of the adjacent stairway skirt guards added in section.
Figure 5:
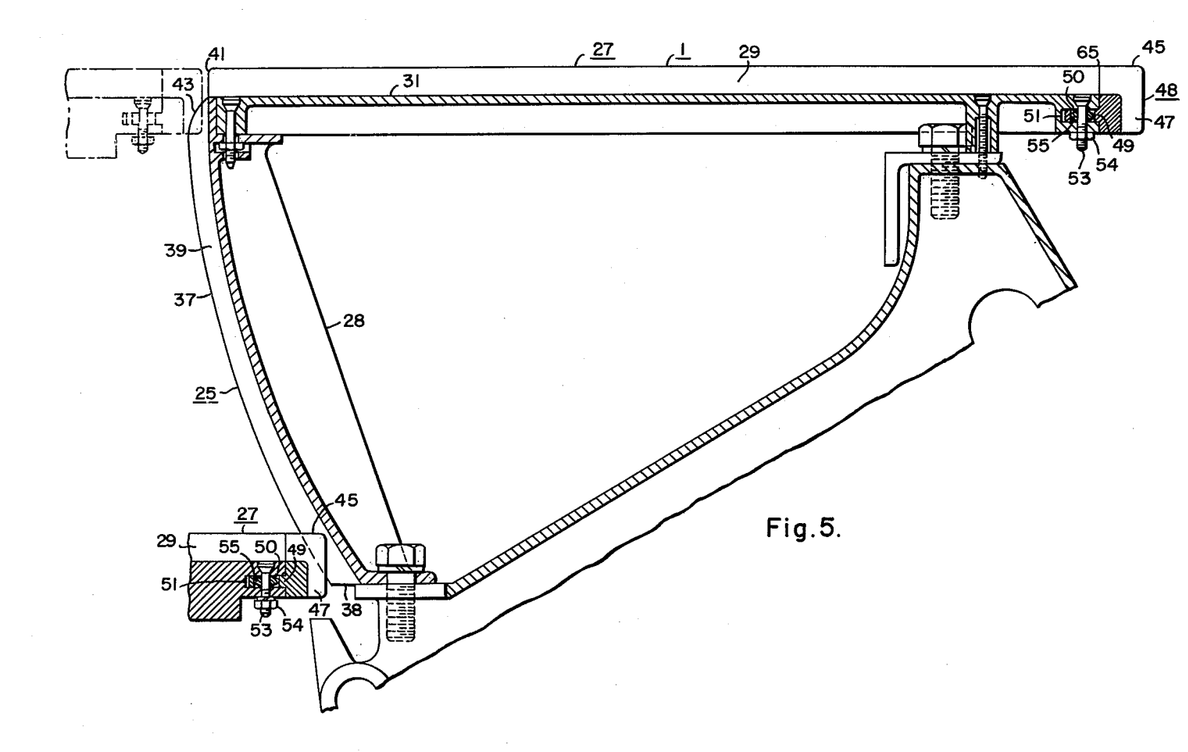
Fig. 5 is an enlarged detailed view in sectional side elevation, with portions broken away and parts omitted, of the steps shown in Fig. 3.

It may be desirable that those tread cleats 57 immediately adjacent the stairway skirt guards 59 do not extend into oppositely disposed grooves in the face of the riser of the next step as is shown in Fig. 2. In such a case the arrangement of Fig. 3 may be used. It will be noted there that the ends 61 of tread cleats 57a are in alignment with the bottoms of the recesses 47. The riser 25a of the next step is modified accordingly, adjacent the stairway skirt guards 59, as is clearly shown at 63 in Figs. 3 and 4.

It will be observed that where an assembly 48 of detachable comb fingers is provided for each tread 27 that there is a demarcation line 65 between the comb finger assembly 48 and the remainder of the step tread. Such a demarcation line is especially visible when the comb finger assembly is fabricated of a material having a color different from that of the remainder of the step tread. This demarcation line acts as a visual aid to deter stairway passengers from stepping partly onto one and partly on to the adjacent step, which may result in stumbling or falling, especially during the transition from platform to step formation.

The above-described embodiment of the invention wherein adjacent steps are provided with intermeshing tread cleat extensions and riser cleats, may be used to particular advantage in modern moving stairways having steps employing relatively narrow tread cleats and grooves of the following dimensions. Each groove is not more than one-quarter (¼) inch wide, and the distance from center to center of adjoining grooves is not more than three-eights (⅜) inch, a practical distance from center to center of adjoining grooves being one-third (⅓) inch. It is to be understood, however, that the invention is also applicable to moving stairway steps having groove widths greater than one quarter (¼) inch and distances from center to center of adjoining grooves greater than three-eights (⅜) inch.

Figure 6:
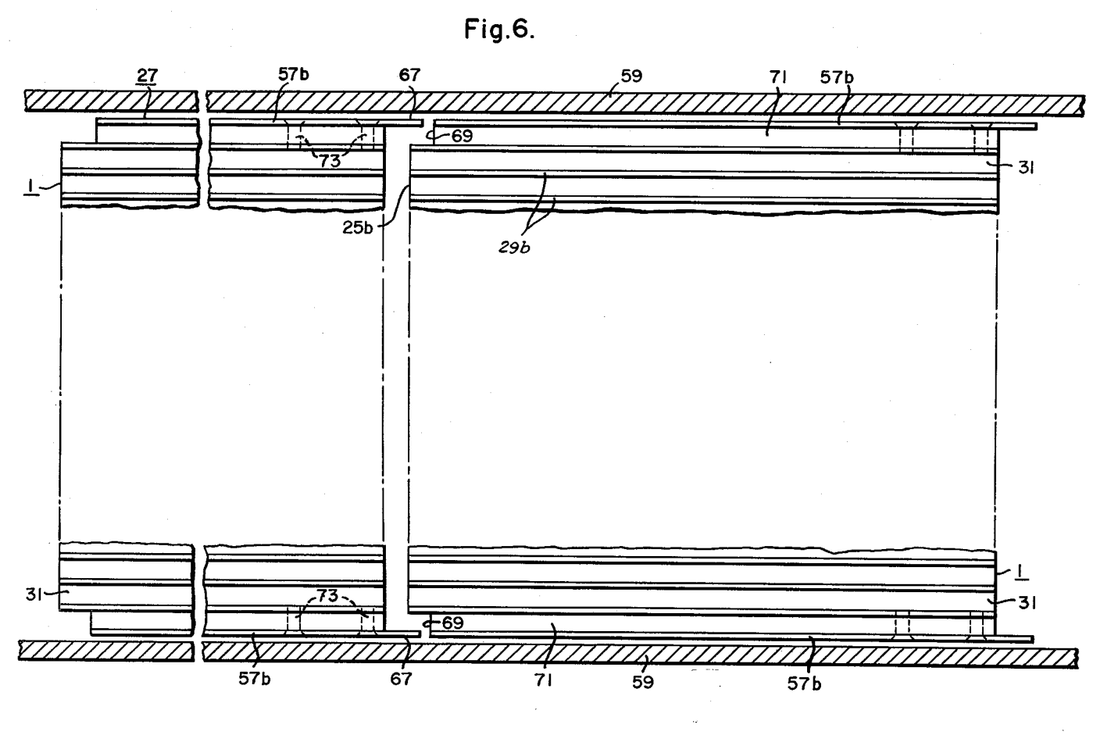
Fig. 6 is a top plan view, with portions broken away and parts omitted, of the two stairway skirt guards and another modification of the two steps shown in Fig. 2.
Figure 7:
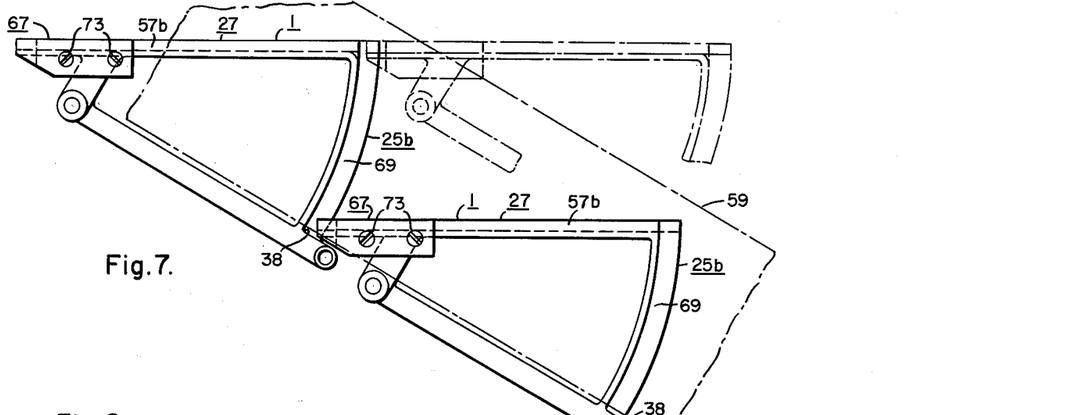
Fig. 7 is a view in side elevation, with portions broken away and parts omitted, of the two steps shown in Fig. 6.

Referring now to Figs. 6 and 7, each stairway step is provided with tread cleat extensions 67 forming comb fingers for only those tread cleats 57b immediately adjacent the stairway skirt guards 59. The tread cleat extensions 67 extend into oppositely disposed recesses 69 in the face of the riser 25b of the next step when the stairway steps are in both platform and step formation and during the transition between platform and step formation. The riser 25b may have cleats and the step may have comb fingers coacting with the riser cleats in the manner previously discussed. Alternatively, the riser 25b may be a conventional smooth riser (with the exception of the recesses 69) of a suitable material such as stainless steel.

The recess 69 extends vertically from the bottom 38 of step riser 25b to the top of the tread cleat 57b. It will be observed that the recess 69 is relatively wide compared with the width of the tread cleat extensions 67, the total width of the recess 69 being the width of the tread cleat 57b plus the width of the adjacent tread groove 71. The tread cleat extensions 67 may be detachable from the remainder of the step tread, in which case suitable fastening means such as screws 73 are provided to secure the tread cleat extensions to the remainder of the step tread. The material from which these tread cleat extensions are fabricated may be the same or different from that of the remainder of the step, for example steel or plastic.

The provision of tread cleat extensions 67 and relatively wide oppositely disposed riser recesses 69 furnishes means for preventing objects from being drawn in between the sides of the steps and the adjacent stairway skirt guards 59 at the riser end of each step.

Figure 8:
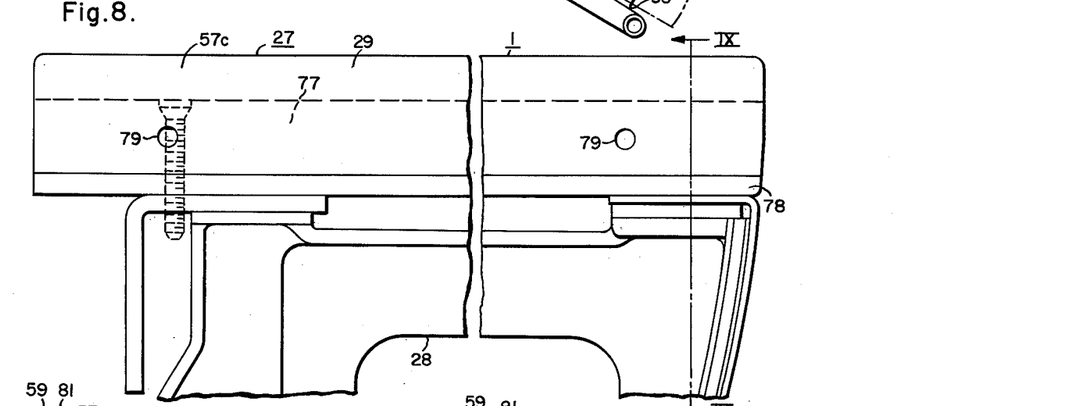
Fig. 8 is an enlarged detail view in side elevation, with portions broken away and parts omitted, of one of the steps shown in Fig. 1.
Figure 9:
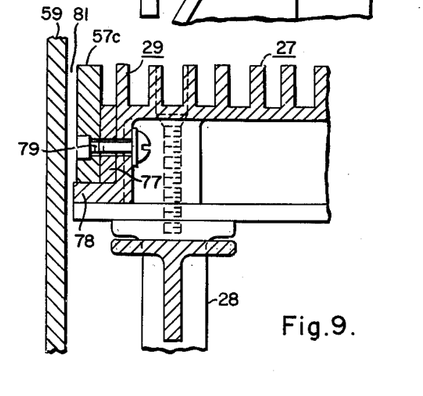
Fig. 9 is a sectional view taken along the line IX—IX of Fig. 8, with a sectional portion of the adjacent stairway skirt guard added.
Figure 10:
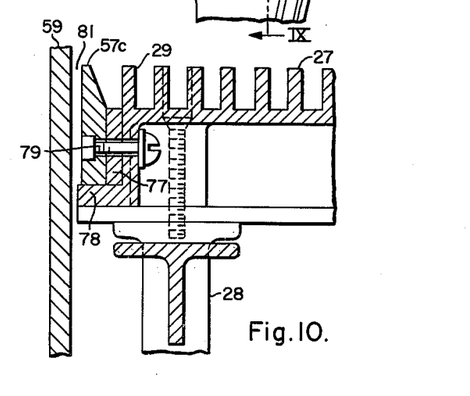
Fig. 10 is a sectional view of a modified form of the step shown in Fig. 9.

As shown in Figs. 8, 9 and 10, each tread cleat 57c immediately adjacent each stairway skirt guard 59 is detachable from the remainder of the tread 27. The tread cleat 57c is of a relatively resilient material, such as rubber, having a higher coefficient of friction than that of adjacent stairway parts, which are fabricated of substantially non-resilient material such as aluminum. Suitably fastened to the tread cleat 57c is a strip 77 of substantially non-resilient material such as steel. The assembly of the resilient cleat 57c and the strip 77 is seated on a flange 78 and preferably detachably secured to the side of the step such as by screws 79. As shown in Figs. 9 and 10, the cross-sectional area of the resilient cleat 57c may be either rectangular or V-shaped, respectively.

A clearance of three-sixteenths (³⁄₁₆) inch maximum is commonly provided on either side of the steps of a moving stairway between the steps and the adjacent skirt guards, resulting in the presence of gap 81. When an object such as a passenger's shoe comes into contact with the cleat 57c and the adjacent skirt guard 59, such object will be prevented from being drawn into the gap 81 as the stairway moves vertically, by virtue of the resiliency and relatively high coefficient of friction of the cleat 75c. The force on top of the cleat 57c due to such object will cause the cleat 57c to move in a direction such that the gap 81 will be closed.

Figure 11:
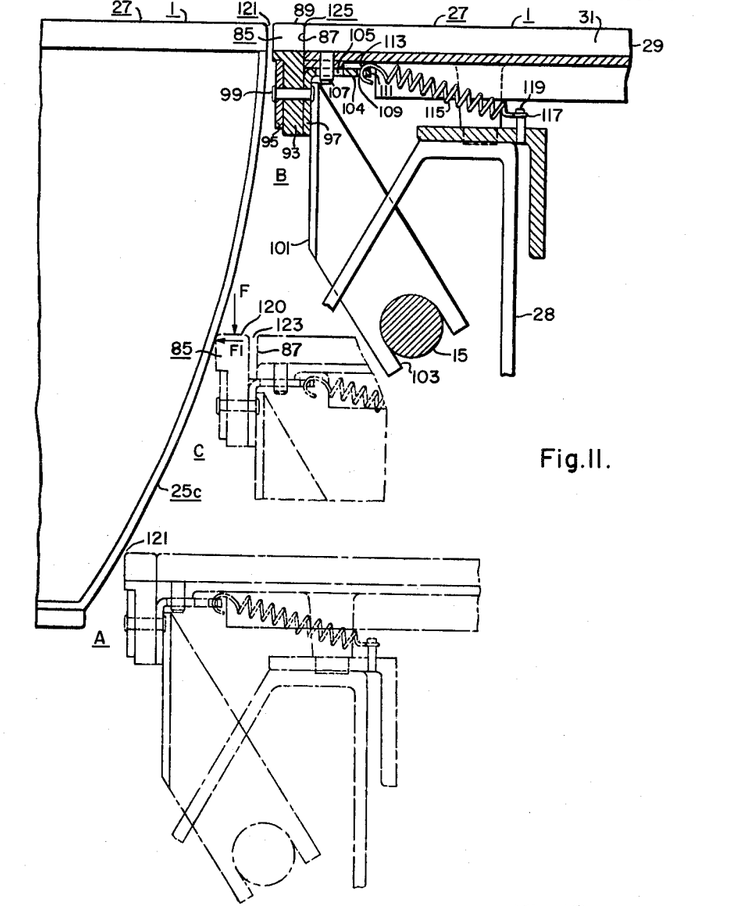
Fig. 11 is an enlarged detail view in sectional side elevation, with portions broken away and parts omitted, of another modification of the two steps shown in Fig. 2.
Figure 12:
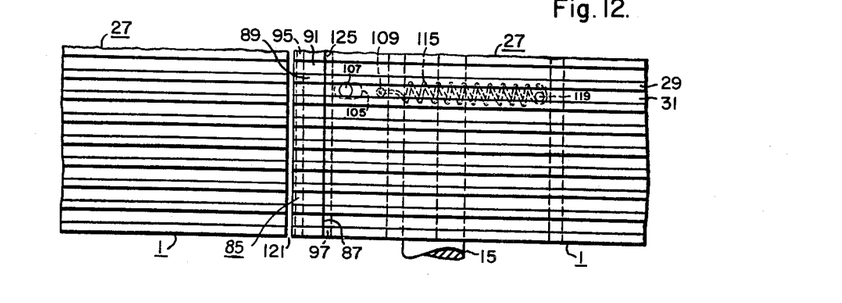
Fig. 12 is a top plan view, with portions broken away and parts omitted, of the two steps shown in Fig. 11.

Referring now to Figs. 11 and 12, each stairway step is provided with a movable end portion 85 at the end 87 of the tread 27 adjacent the riser 25c of the next step. The movable end portion 85 comprises an assembly of cleat segments 89 aligned with the tread cleats 29 and groove segments 91 aligned with the tread grooves 31. The riser 25c may have cleats and the end portion 85 may have comb fingers coacting with the riser cleats in the manner previously discussed. Alternatively, the riser 25c may be a conventional smooth riser of a suitable material such as stainless steel.

A retaining strip 95 and a bracket 97 are suitably fastened to the base 93 of the movable end portion 85 such as by screws or rivets 99. The bracket 97 is secured as by welding to a plurality of downwardly extending brackets 101 which are pivotally connected to the wheel axle 15 by means of a slot 103. Disposed in the horizontal leg 104 of the bracket 97 is an elongated slot 105 through which passes a pin 107 suitably fastened to the underside of the tread 27. The cooperation of the pin 107 and the slot 105 prevents relative sideways movement between the movable end portion 85 and the remainder of the tread 27 while allowing movement of the end portion 85 in the direction desired, as described below. An aperture 109 is disposed near the end 111 of the horizontal leg 104 of the bracket 97. Through the aperture 109 passes one end 113 of a biasing spring 115. The opposite end 117 of the spring 115 is secured to a pin 119 which is suitably fastened to the step at any appropriate point, such as to the yoke 28 as shown in Fig. 11.

The normal position of the movable end portion 85, due to the action of the biasing spring 115, is as shown in Fig. 12 and at A and B in Fig. 11. A force F, applied by the shoe of a stairway passenger, for example, to the top surface 120 of the movable end portion 85, as shown at C in Fig. 11, causes the movable end portion to pivot around the axle 15 through the brackets 101 and thus to close the gap 121 between the movable end portion 85 and the riser 25c of the next step. Such action prevents objects from entering the gap 121 and being drawn in between the end of the tread 27 and the riser 25c when there is relative vertical movement between adjacent stairway steps, i.e., during the transition between platform and step formation. When there is such relative vertical movement between adjacent steps, the force F will be increased due to the friction between the movable end portion 85 and the riser 25c, consequently increasing force F1. It will be observed that when the force F is applied to the movable end portion 85a gap 123 results between the movable end portion 85 and the tread end 87, which are then stationary relative to one another.

The abutting of the movable end portion 85 with the end 87 of the tread 27 results in a demarcation line 125 at the end of the tread 27. This demarcation line acts as a visual aid to deter stairway passengers from stepping partly onto one and partly onto the adjacent step, which may result in stumbling or falling, especially during the transition from platform to step formation. Such a demarcation line is especially visible when the movable end portion 85 is fabricated of a material having a color different from that of the step tread 27.

Figure 13:
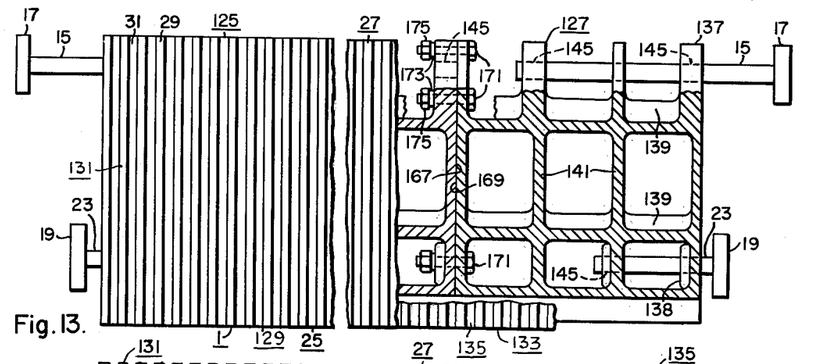
Fig. 13 is a top plan view partially in section of a modification of one of the steps, with its associated rollers and roller axles, shown in Fig. 1.
Figure 14:
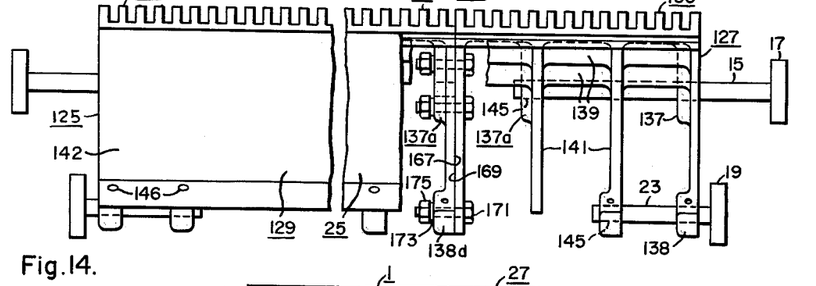
Fig. 14 is a view in front elevation, with portions broken away, of the step shown in Fig. 13.
Figures 15, 16, 17:
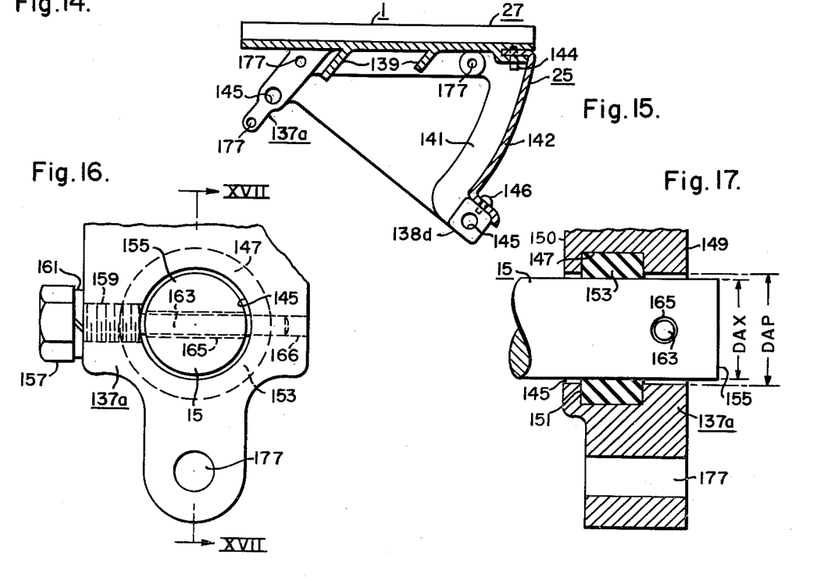
Fig. 15 is a view in sectional side elevation, with parts omitted, of the step shown in Fig. 13.
Fig. 16 is an enlarged detail view, with parts broken away, of the support and fastening means for a chain wheel axle of the step of Fig. 13.
Fig. 17 is a sectional view taken along the lines XVII—XVII of Fig. 16.

Figs. 13, 14 and 15 show a moving stairway step comprising a plurality of sections of unitary construction 125 and 127, i.e., section 125 has an integral riser section 129 and tread section 131 and section 127 has an integral riser section 133 and tread section 135. Riser sections 129 and 133 together form the riser 25 of the complete step; and tread sections 131 and 135 together form the tread 27 of the complete step. Supports 137 and 138 for the step wheel axles 15 and 23, respectively, may also be integral with each of the unitary sections 125 and 127, as is clearly shown in Figs. 13, 14 and 15; or they may be separately fabricated and fastened by suitable means to each of the sections 125 and 127. Each section 125 and 127 may be of aluminum die cast construction, which is well known in the art, having strengthening ribs 139 and 141. The riser 25 of the complete step may have a facing 142 of an appropriate material such as stainless steel suitably secured thereto as by cementing and by pins 144 and screws 146.

While only the tread 27 is shown in Figs. 13 and 14 to have cleats and grooves therebetween, the riser 25 may also have cleats and grooves therebetween, as heretofore described. In addition, while the step in Figs. 13 and 14 is shown to comprise two sections of unitary construction 125 and 127, a greater number of sections may be used; or each step may comprise a single section of unitary construction, simply by eliminating section 127, for example, and by fastening its wheel axles 15 and 23 with their respective wheels 17 and 19 to section 125 in the manner to be described below. It is desirable to use an assembly of a plurality of such sections when a relatively wide step is required and to use a single section when a relatively narrow step is required.

The arrangement of wheel axle supports 137 and 138 and the wheel axles 15 and 23 respectively passing therethrough is in general the same for each support and axle and will be described with particular reference to the support 137a and the axle 15, as shown in Figs. 16 and 17. The step wheel axle 15 passes through an aperture 145 in the wheel axle support 137a. The diameter DAP of the aperture 145 is greater than the diameter DAX of the axle 15, a practical difference in diameters being 0.010 inch. The support 137a has an annular groove 147 disposed substantially within the ends 149 and 150 of the aperture 145. Disposed within the walls 151 of the annular groove 147 is a resilient ring 153 of a suitable elastomer such as rubber having an inside diameter smaller than the diameter DAP of the aperture 145 and preferably, when unrestricted, slightly smaller than the diameter DAX of the axle 15, so that the ring 153 is compressed somewhat when the axle is inserted therethrough. The resilient ring 153, the annular groove 147, and the aperture 145 cooperate to isolate the axle 15 from direct contact with its support 137a at all times, even when the resilient ring 153 is fully compressed due to a load disposed on the top surface of the tread 27.

Disposed near the end 155 of the axle 15 is a bolt 157 which is inserted into a threaded aperture 159 in the support 137a and held securely in place by a lockwasher 161. The unthreaded end portion 163 of the bolt 157 is inserted through an aperture 165 in the axle 15 and thence through another aperture 166 in the support 137a. It will be observed that the diameter of the aperture 165 is slightly greater than the diameter of the unthreaded end portion 163 of the bolt 157 in order to effect isolation between the axle and its support. The bolt 157, and the support 137a and the apertures 159, 165 and 166 cooperate to hold the axle 15 securely in place, preventing substantial sideways movement thereof relative to the step itself.

Adjoining faces 167 and 169 of the abutting sections 125 and 127, respectively, have accurately machined surfaces for aligning sections 125 and 127 with one another. Securing means consisting of bolts 171, lockwashers 173 and nuts 175 are provided for fastening sections 125 and 127 together, the bolts 171 passing through apertures 177 and through the apertures 145 in the wheel axle support 138d, which is otherwise provided for receiving one of the wheel axles 23 in the event that it is desired to use but a single section of unitary construction for the stairway step as heretofore mentioned.

Although the invention has been described with reference to certain specific embodiments thereof, numerous modifications falling within the spirit and the scope of the invention are possible.

I claim as my invention:

1. In a moving stairway extending from a lower landing to an upper landing, a comb disposed at each landing and a plurality of similar steps, including first and second adjacent steps, disposed to travel between said landings, each step having a riser part and a tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, one end of each of the tread cleats provided for said first step extending into an oppositely disposed vertically extending riser groove in the face of the riser part of said second step throughout the travel of said first and second steps between said lower and upper landings, each of said riser grooves being aligned with a separate one of said tread cleats of said second step and terminating substantially below the upper surface of the tread part of said second step.

2. In a moving stairway extending from a lower landing to an upper landing, a plurality of steps disposed to travel between said landings, and a stairway skirt guard disposed at each side of said steps, each step having a riser part and a tread part, the tread part of each step adjacent the riser part of the next step being provided with two comb fingers, a separate one of said comb fingers being disposed at each side of each tread part immediately adjacent each of said stairway skirt guards, said comb fingers projecting into oppositely disposed vertically extending riser recesses in the face of the riser part of said next step throughout the travel of the stairway steps between said lower and upper landings, the major portion of the riser part of each step intermediate said recesses having a smooth surface, said comb fingers of each tread part projecting beyond the major portion of the tread part intermediate said comb fingers.

3. In a moving stairway, a step having edges adjacent three other stairway parts in spaced relationship therewith, and means mounting at least one of said edges for movement relative to the remainder of the step to close the space between the last-named edge and one of its adjacent stairway parts.

4. In a moving stairway having stairway parts, a step provided with a substantially non-resilient tread mounted for movement past said stairway parts, said tread having resilient side edges adjacent said stairway parts, said resilient side edges having a higher coefficient of friction than that of said adjacent stairway parts.

5. In a moving stairway extending from a lower landing to an upper landing, a comb disposed at each landing and a plurality of steps disposed to travel between said landings, each step having a riser part and a tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, the end portions of the tread cleats of a first one of the steps adjacent the riser part of the next step constituting a unit spaced from said riser part of said next step, said unit being movable relative to the remainder of the first one of the steps to close the space between the unit and the riser part of said next step in response to the application of a downward force applied to the top surface of said unit.

6. In a moving stairway extending from a lower landing to an upper landing, a plurality of spaced steps disposed to travel between said landings, each step having an expandible tread part responsive to a load on such step for expansion to substantially fill the space between such step and an adjacent one of the steps.

7. In a moving stairway extending from a lower landing to an upper landing, a comb disposed at each landing and a plurality of steps disposed to travel between said landings, each step having a riser part and a tread part, each tread part having first and second assemblies, each of the assemblies having a plurality of tread cleats and grooves therebetween for meshing with the teeth of said comb, said tread cleats and grooves extending in the direction of stairway travel, the tread cleats and grooves of each step being aligned with those of each of the other steps, said first assembly for each of the steps being adjacent the riser part of the next step and being spaced from said riser part of said next step, means mounting each first assembly for movement in relation to the associated second assembly to close the space between one of said first assemblies and the riser part of said next step in response to the application of a downward force applied to any portion of the upper surface of said last-named first assembly, together with biasing means effective to bias each of the first assemblies towards the associated second assemblies.

8. In a moving stairway extending from a lower landing to an upper landing, a plurality of similar steps, including first and second adjacent steps, disposed to travel between said landings, each step having a riser part, a tread part, a plurality of wheel axles spaced in the direction of step travel, and wheels rotatably mounted on the wheel axles for guiding the steps, in which that end of the tread part of said first step adjacent the riser part of said second step is spaced from said riser part of said second step, said end comprising movable means movable relative to the remainder of the tread part, means mounting said movable means pivotally on that wheel axle of said first step disposed most closely to said movable means for movement in response to a downward force applied to the upper surface of the movable means for moving the movable means to close the space between said end and the riser part of said second step, and biasing means engaging said movable means and the remainder of said first step effective to maintain said movable means in contact with the end of the remainder of the tread part of said first step in the absence of said force.

9. In a moving stairway step, a riser, a tread, a plurality of wheel axles, a plurality of supports for receiving the wheel axles, and wheels rotatably mounted on the axles for guiding the steps, the step comprising a first section and a second section in side-by-side relationship, each of said sections being of unitary construction and having a riser part and a tread part, said riser part and tread part of each section being integral with one another and forming, respectively, individual portions of the riser and the tread of said step, said first section having a first integral axle support adjacent a first exposed side of the step for receiving a first one of said axles, said second section having a second integral axle support adjacent a second exposed side of the step for receiving a second one of said axles, said first section having a third integral axle support adjacent the side of said first section opposite said first exposed side for receiving said second axle to permit said first section to be used as an independent stairway step.

10. In a moving stairway extending from a lower landing to an upper landing, a comb disposed at each landing and a plurality of similar steps, including first and second adjacent steps, disposed to travel between said landings, each step having a riser part and a tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, that end of the tread part of said first step adjacent the riser part of said second step being provided with comb fingers and recesses therebetween, each of said comb fingers constituting an extension of an associated one of the tread cleats provided for said first step, each of said comb fingers projecting into an oppositely disposed vertically extending riser groove in the face of the riser part of said second step throughout the travel of said first and second steps between said lower and upper landings, each of said riser grooves being aligned with a separate one of said tread cleats of said second step, and means detachably securing said comb fingers to said first step, said means allowing appreciable movement of said comb fingers relative to said first step in a direction transverse to the direction of travel of said steps between said lower and upper landings.

11. In a moving stairway extending from a lower landing to an upper landing, a comb disposed at each landing and a plurality of similar steps, including first and second adjacent steps, disposed to travel between said landings, each step having a riser part and a tread part, each tread part being provided with a plurality of tread cleats and grooves therebetween for meshing with the teeth of said comb, said tread cleats and grooves extending in the direction of stairway travel, the thread cleats and grooves of each step being aligned with those of each of the other steps, that end of the tread part of said first step adjacent the riser part of said second step being provided with comb fingers and recesses therebetween, each of said comb fingers constituting an extension of an associated one of the tread cleats provided for said first step, each of said comb fingers projecting into an oppositely disposed vertically extending riser groove in the face of the riser part of said second step throughout the travel of said first and second steps between said lower and upper landings, each of said riser grooves being aligned with a separate one of said tread cleats of said second step, means detachably securing said comb fingers to said first step, and resilient means biasing said comb fingers to predetermined positions, said resilient means permitting limited movement of said comb fingers relative to said first step in a direction transverse to the direction of travel of said steps between said lower and upper landings.

12. In a moving stairway extending from a lower landing to an upper landing, a comb disposed at each landing and a plurality of similar steps, including first and second adjacent steps, disposed to travel between said landings, each step having a riser part and a tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, that end of the tread part of said first step adjacent the riser part of said second step being provided with comb fingers and recesses therebetween, each of said comb fingers constituting an extension of an associated one of the tread cleats provided for said first step, each of said comb fingers projecting into an oppositely disposed vertically extending riser groove in the face of the riser part of said second step throughout the travel of said first and second steps between said lower and upper landings, each of said riser grooves being aligned with a separate one of said tread cleats of said second step, means detachably securing said comb fingers to the tread part of said first step, and resilient bushings interposed between said means and the tread part of said first step, said resilient bushings permitting limited movement of said comb fingers relative to the tread part of said first step in a direction transverse to the direction of travel of said steps between said lower and upper landings.

13. In a moving stairway extending from a lower landing to an upper landing, a comb disposed at each landing, a plurality of similar steps, including first and second adjacent steps, disposed to travel between said landings, and a stairway skirt guard disposed at each side of said steps, each step having a tread part and a riser part adjacent one end of said tread part, each tread part being provided with a pair of side cleats and a plurality of cleats intermediate the side cleats for meshing with the teeth of said comb, said tread cleats extending in the direction of stairway travel, the tread cleats of each step being aligned with those of each of the other steps, each of said side tread cleats being disposed adjacent an associated one of said stairway skirt guards, in which said side tread cleats of each step project beyond the intermediate tread cleats thereof at the riser end of the tread part thereof, a portion of each of said intermediate tread cleats of each step projecting beyond the side tread cleats thereof at the end opposite the riser end of the tread part thereof, the projecting portion of each of said intermediate tread cleats of each step extending into a separate oppositely disposed vertically extending riser recess in the face of the riser part of the next step throughout the travel of said steps between said lower and upper landings.

14. In a moving stairway extending from a lower landing to an upper landing, a comb disposed at each landing, a plurality of similar steps disposed to travel between said landings, and a stairway skirt guard disposed at each side of said steps, each step having a tread part and a riser part adjacent one end of said tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, said tread cleats of each step including a pair of side tread cleats, a separate one of said side tread cleats being disposed at each side of its associated tread part immediately adjacent each of said stairway skirt guards, that end of each of said side tread cleats of each step adjacent the riser part of the next step projecting into an oppositely disposed vertically extending riser recess in the face of the riser part of said next step throughout the travel of said steps between said lower and upper landings, each of said riser recesses having a minimum width of substantially the width of the side tread cleat adjacent thereto plus the width of the tread groove adjacent the last-named side tread cleat.

15. In a moving stairway extending from a lower landing to an upper landing, a plurality of steps disposed to travel between said landings, each step having a tread part, a stairway skirt guard disposed at each side of said steps in spaced relationship therewith, each tread part having a resilient tread cleat disposed at each side thereof adjacent the associated stairway skirt guard and a plurality of substantially non-resilient tread cleats intermediate the associated resilient tread cleats, said resilient and substantially non-resilient tread cleats extending in the direction of stairway travel, each of said resilient tread cleats having a higher coefficient of friction than that of adjacent stairway parts, at least a part of each of said resilient cleats being movable to close the space between its associated step and the adjacent stairway skirt guard.

16. In a moving stairway extending from a lower landing to an upper landing, a plurality of steps disposed to travel between said landings, each step having a tread part, a stairway skirt guard disposed at each side of said steps in spaced relationship therewith, each tread part having a resilient tread cleat disposed at each side thereof adjacent the associated stairway skirt guard and a plurality of substantially non-resilient tread cleats intermediate the associated resilient tread cleats, said resilient and substantially non-resilient tread cleats extending in the direction of stairway travel, each of said resilient tread cleats being tapered toward the top thereof and having a higher coefficient of friction than that of adjacent stairway parts, at least a part of each of said resilient cleats being movable to close the space between its associated step and the adjacent stairway skirt guard.

17. In a moving stairway extending from a lower landing to an upper landing, a comb disposed at each landing, a plurality of similar steps, including first and second adjacent steps, disposed to travel between said landings, and a stairway skirt guard disposed at each side of said steps, each step having a tread part and a riser part adjacent one end of said tread part, each tread part being provided with a pair of side cleats and a plurality of cleats intermediate the side cleats for meshing with the teeth of said comb, said tread cleats extending in the direction of stairway travel, the tread cleats of each step being aligned with those of each of the other steps, each of said side tread cleats being disposed adjacent an associated one of said stairway skirt guards, in which said side tread cleats of each step project beyond the intermediate tread cleats thereof at the riser end of the tread part thereof, a portion of each of said intermediate tread cleats of each step projecting beyond the side tread cleats thereof at the end opposite the riser end of the tread part thereof, the projecting portion of each of said intermediate tread cleats of each step extending into a separate oppositely disposed vertically extending riser recess in the face of the riser part of the next step throughout the travel of said steps between said lower and upper landings, and means detachably securing the projecting portions of said intermediate tread cleats to their associated steps, said means allowing appreciable movement of said projecting portions relative to their associated steps in a direction transverse to the direction of travel of said steps between said lower and upper landings.

18. In a moving stairway extending from a lower landing to an upper landing, a comb disposed at each landing, a plurality of similar steps, including first and second adjacent steps, disposed to travel between said landings, and a stairway skirt guard disposed at each side of said steps, each step having a tread part and a riser part adjacent one end of said tread part, each tread part being provided with a pair of side cleats and a plurality of cleats intermediate the side cleats for meshing with the teeth of said comb, said tread cleats extending in the direction of stairway travel, the tread cleats of each step being aligned with those of each of the other steps, each of said side tread cleats being disposed adjacent an associated one of said stairway skirt guards, in which said side tread cleats of each step project beyond the intermediate tread cleats thereof at the riser end of the tread part thereof, a portion of each of said intermediate tread cleats of each step projecting beyond the side tread cleats thereof at the end opposite the riser end of the tread part thereof, the projecting portion of each of said intermediate tread cleats of each step extending into a separate oppositely disposed vertically extending riser recess in the face of the riser part of the next step throughout the travel of said steps between said lower and upper landings, means detachably securing the projecting portions of said intermediate tread cleats to their associated steps, and resilient means biasing said projecting portions to predetermined positions, said resilient means permitting limited movement of said projecting portions relative to their associated steps in a direction transverse to the direction of travel of said steps between said lower and upper landings.

19. In a moving stairway extending from a lower landing to an upper landing, a comb disposed at each landing, a plurality of similar steps, including first and second adjacent steps, disposed to travel between said landings, and a stairway skirt guard disposed at each side of said steps, each step having a tread part and a riser part adjacent one end of said tread part, each tread part being provided with a pair of side cleats and a plurality of cleats intermediate the side cleats for meshing with the teeth of said comb, said tread cleats extending in the direction of stairway travel, the tread cleats of each step being aligned with those of each of the other steps, each of said side tread cleats being disposed adjacent an associated one of said stairway skirt guards, in which said side tread cleats of each step project beyond the intermediate tread cleats thereof at the riser end of the tread part thereof, a portion of each of said intermediate tread cleats of each step projecting beyond the side tread cleats thereof at the end opposite the riser end of the tread part thereof, the projecting portion of each of said intermediate tread cleats of each step extending into a separate oppositely disposed vertically extending riser recess in the face of the riser part of the next step throughout the travel of said steps between said lower and upper landings, means integrating the projecting portions of said intermediate tread cleats of each step into an assembly of unitary construction, means detachably securing said assembly to its associated step, and resilient means biasing said assembly to a predetermined position, said resilient means permitting limited movement of said assembly relative to its associated step in a direction transverse to the direction of travel of said steps between said lower and upper landings.

20. In a moving stairway extending from a lower landing to an upper landing, a comb disposed at each landing and a plurality of similar steps, including first and second adjacent steps, disposed to travel between said landing, each step having a riser part and a tread part, each tread part being provided with a plurality of tread cleats and grooves therebetween for meshing with the teeth of said comb, said tread cleats and grooves extending in the direction of stairway travel the tread cleats and grooves of each step being aligned with those of each of the other steps, and a member of unitary construction detachably secured to that end of the tread part of said first step adjacent the riser part of said second step, said member comprising comb fingers having recesses therebetween, each of said comb fingers constituting an extension of an associated one of the tread cleats provided for said first step, each of said comb fingers projecting into an oppositely disposed vertically extending riser groove in the face of the riser part of said second step throughout the travel of said first and second steps between said lower and upper landings, each of said riser grooves being aligned with a separate one of said tread cleats of said second step.

21. In a moving stairway extending from a lower landing to an upper landing, a comb disposed at each landing and a plurality of similar steps, including first and second adjacent steps, disposed to travel between said landings, each step having a riser part and a tread part, each tread part being provided with a plurality of tread cleats and grooves therebetween for meshing with the teeth of said comb, said tread cleats and grooves extending in the direction of stairway travel the tread cleats and grooves of each step being aligned with those of each of the other steps, an integral member detachably secured to that end of the tread part of said first step adjacent the riser part of said second step, said member comprising comb fingers having recesses therebetween, each of said comb fingers constituting an extension of an associated one of the tread cleats provided for said first step, each of said comb fingers projecting into an oppositely disposed vertically extending riser groove in the face of the riser part of said second step throughout the travel of said first and second steps between said lower and upper landings, each of said riser grooves being aligned with a separate one of said tread cleats of said second step, and resilient means biasing said integral member and thereby said comb fingers to predetermined positions, said resilient means permitting limited movement of said integral member and thereby of said comb fingers relative to said first step in a direction transverse to the direction of travel of said steps between said lower and upper landings.

22. In a moving stairway having stairway parts, a step provided with a substantially non-resilient tread mounted for movement past said stairway parts in spaced relationship therewith, said tread having resilient side edges adjacent said stairway parts, said resilient side edges having a higher coefficient of friciton than that of said adjacent stairway parts, said resilient side edges being spaced from said adjacent stairway parts by a distance which is greater than the distance by which the remainder of said step is spaced from said adjacent stairway parts.

23. In a moving stairway extending from a lower landing to an upper landing, a plurality of steps disposed to travel between said landings, each step having a tread part, a stairway skirt guard disposed at each side of said steps in spaced relationship therewith, each tread part having a resilient tread cleat disposed at each side thereof adjacent the associated stairway skirt guard and a plurality of substantially non-resilient tread cleats intermediate the associated resilient tread cleats, said resilient and substantially non-resilient tread cleats extending in the direction of stairway travel, each of said resilient tread cleats having a higher coefficient of friction than that of adjacent stairway parts, at least a part of each of said resilient cleats being movable to close the space between its associated step and the adjacent stairway skirt guard, each of said resilient tread cleats in its normal position being spaced from its adjacent stairway skirt guard by a distance which is greater than the distance by which the remainder of its associated step is spaced from the last-named stairway skirt guard.

24. A moving stairway step comprising a riser part and a tread part, the tread part being provided with a plurality of tread cleats and grooves therebetween, said tread cleats and grooves extending from the front of the tread part adjacent the riser part to the rear of the tread part parallel to the sides of the step, each of said tread cleats extending outwardly at the rear end of the tread part to form a comb finger, the face of the riser part being provided with a plurality of riser cleats and grooves therebetween whose center lines are aligned with the center lines of said tread grooves and cleats, respectively, said riser cleats and grooves extending vertically from the lower portion of the riser part and terminating substantially below the load-bearing surface of the tread part, in which a plane parallel to said surface intersects portions of both said comb fingers and said rise cleats and grooves.

25. A moving stairway step comprising a riser part and a tread part, the tread part being provided with a side cleat immediately adjacent each side of the step and a plurality of grooves and cleats therebetween intermediate the side cleats, said tread cleats and grooves extending from the front of the tread part adjacent the riser part to the rear of the tread part parallel to the sides of the step, each of said intermediate tread cleats extending beyond said side tread cleats at the rear end of the tread part to form a comb finger, said side tread cleats extending beyond said intermediate tread cleats at the front end of the tread part, the face of the riser part being provided with a plurality of riser grooves and cleats therebetween whose center lines are aligned with the center lines of said intermediate tread cleats and grooves, respectively, said riser grooves and cleats extending vertically from the lower portion of the riser part and terminating substantially below the load-bearing surface of the tread part, in which a plane parallel to said surface intersects portions of both said comb fingers and said riser cleats and grooves.

26. A moving stairway step comprising a riser part and a tread part, the tread part being provided with a side cleat immediately adjacent each side of the step and a plurality of grooves and cleats therebetween intermediate the side cleats, said tread cleats and grooves extending from the front of the tread part adjacent the riser part to the rear of the tread part parallel to the sides of the step, each of said intermediate tread cleats extending beyond said side tread cleats at the rear end of the tread part to form a comb finger, means integrating said comb fingers into an assembly of unitary construction, means detachably securing said assembly to said step, and resilient means biasing said assembly to a predetermined position, said resilient means permitting limited movement of said assembly relative to said step in a direction transverse to the sides of said step, said side tread cleats extending beyond said intermediate tread cleats at the front end of the tread part, the face of the riser part being provided with a plurality of riser grooves and cleats therebetween whose center lines are aligned with the center lines of said intermediate tread cleats and grooves, respectively, said riser grooves and cleats extending vertically from the lower portion of the riser part and terminating substantially below the load-bearing surface of the tread part, in which a plane parallel to said surface intersects portions of both said comb fingers and said riser cleats and grooves.

27. A moving stairway step comprising a riser part and a tread part, a pair of similar comb fingers, a separate one of said comb fingers being disposed at each side of the tread part at the rear end opposite the riser end thereof, said comb fingers projecting beyond the major portion of the tread part intermediate said comb fingers, and a pair of riser recesses, a separate one of said riser recesses being disposed at each side of the riser part and extending vertically from the bottom of the riser part to the top of the tread part, each of said riser recesses having a width dimension which is greater than the width dimension of said comb fingers, the major portion of the riser part intermediate said recesses having a smooth surface.

28. A moving stairway step comprising a riser part and a tread part, the tread part being provided with a resilient side cleat immediately adjacent each side of the step and a plurality of substantially non-resilient cleats having grooves therebetween intermediate the side cleats, said tread cleats and grooves extending from the front of the tread part adjacent the riser part to the rear of the tread part parallel to the sides of the step.

29. A moving stairway step having a riser part and a tread part, the end of said tread part opposite the riser end thereof being expansible to increase the overall length of said tread part in response to a load on said tread part.

30. A moving stairway step of unitary construction comprising a riser part, a tread part and a plurality of wheel axle supports, and means integral with said step to permit securing thereto of an additional step for increasing the width of the step.

31. In a moving stairway step assembly, an aperture, an axle having a circular cross-sectional area received in said aperture, a wheel rotatably mounted on an outer end of said axle, said aperture having a diameter greater than that of said axle, an annular groove disposed substantially within the ends of said aperture, and a resilient ring disposed within the walls of said groove and having an inside free diameter smaller than the diameter of said axle, said resilient ring and said aperture cooperating to isolate said axle from direct contact with the remainder of said step assembly when said wheel is subjected to its rated load.

32. A moving stairway step having a riser part and a tread part, the rear end of the tread part opposite the riser end thereof being movable with respect to the remainder of the tread part in a direction normal to the sides of said step.

33. A moving stairway step having a riser part and a tread part, the rear end of the tread part opposite the riser end thereof being movable with respect to the remainder of the tread part in a direction normal to the sides of said step, said movable rear end being substantially free of friction relative to the remainder of the tread part.

34. In a load conveying device having a landing, a comb adjacent said landing, a plurality of movable carriages disposed in platform formation, and means mounting said carriages for movement toward said landing, each carriage having a plurality of first cleats extending in the direction of carriage movement for meshing with the teeth of said comb, the first cleats of each carriage being aligned with those of each of the other carriages, one end of each carriage being provided with comb fingers constituting extensions of the first cleats of the same carriage, the opposite end of each carriage having second cleats spaced from the first cleats thereof, the comb fingers of each carriage continuously intermeshing with the second cleats of the adjacent carriage during substantial movment from a position displaced from the landing to the landing.

35. In a moving stairway extending from a lower landing to an upper landing, a comb disposed at each landing and a plurality of similar steps, including first and second adjacent steps, disposed to travel between said landings, each step comprising a riser part having an outwardly facing surface and a tread part, each tread part being provided with a plurality of tread cleats and grooves therebetween for meshing with the teeth of said comb, said tread cleats and grooves extending in the direction of stairway travel, the tread cleats and grooves of each step being aligned with those of each of the other steps, in which said first step has a plurality of vertically extending riser cleats carried by the outwardly facing surface of the riser part of said first step, adjacent ones of said riser cleats being spaced by a vertically extending riser groove, the centerlines of said riser cleats and grooves being aligned with the centerlines of the tread grooves and cleats, respectively, of said first step, said riser cleats and grooves terminating substantially below the upper surfaces of the tread cleats of said first step, each of the tread cleats of said first step extending substantially entirely to one side of the associated outwardly facing riser surface at the upper portion of the riser thereof, that end of each of the tread cleats of said first step adjacent the riser part thereof being substantially normal to the top surface of the last-named tread cleat, and in which that end of the tread part of said second step adjacent the riser part of said first step is provided with tread cleat extensions and recesses therebetween aligned with the tread cleats and grooves, respectively, of said second step, said tread cleat extensions extending into said riser grooves of said first step to intermesh with the vertically extending riser cleats of said first step throughout the travel of said first and second step between said lower and upper landings.

36. A moving stairway step comprising a riser part and a tread part, the tread part being provided with a plurality of tread cleats and grooves therebetween, said tread cleats and grooves extending from the front of the tread part adjacent the riser part to the rear of the tread part parallel to the sides of the step, each of said tread cleats extending outwardly and downwardly at the rear of the tread part to form a comb finger, the face of said riser part being provided with a plurality of riser cleats, said riser cleats being spaced from each other to form a plurality of riser grooves therebetween, the centerlines of said riser cleats and grooves being aligned with the centerlines of said tread grooves and cleats, respectively, each of said riser cleats extending vertically from the lower portion of the riser part and terminating substantially at the bottom of the tread groove with which it is aligned, each of said tread cleats being located entirely to one side of an upward vertical projection of a line joining the bottoms of said riser grooves at their upper terminations, a plane parallel to the load bearing surfaces of said tread part intersecting portions of both said comb fingers and said riser cleats and grooves.

37. A moving stairway step comprising a riser part and a tread part, the tread part being provided with a plurality of tread cleats and grooves therebetween, said tread cleats and grooves extending from the front of the tread part adjacent the riser part to the rear of the tread part parallel to the sides of the step, a comb finger for each of said tread cleats constituting an extension outwardly and downwardly of the associated tread cleat at the rear of the tread part, means integrating said comb fingers into an assembly of unitary construction, means detachably securing said assembly to said tread part, and resilient means biasing said assembly to a predetermined position relative to the remainder of said step, said resilient means permitting limited movement of said assembly relative to said step in a direction transverse to the sides of said step, the face of said riser part being provided with a plurality of riser cleats, said riser cleats being spaced from each other to form a plurality of riser grooves therebetween, the centerlines of said riser cleats and grooves being aligned with the centerlines of said tread grooves and cleats, respectively, each of said riser cleats extending vertically from the lower portion of the riser part and terminating substantially at the bottom of the tread groove with which it is aligned, each of said tread cleats being located entirely to one side of an upward vertical projection of a line joining the bottoms of said riser grooves at their upper terminations, a plane parallel to the load bearing surface of said tread part intersecting portions of both said comb fingers and said riser cleats and grooves.

38. In a moving stairway, a plurality of steps, means mounting the steps for movement in a closed circuit over a load-transporting path and a step-return path, each of said steps having a first part and a second part, the first part of a first step and the second part of a second step adjacent the first step being shaped to interlock against relative movement of such parts in a horizontal direction transverse to the direction of the load-transporting path during movement of such parts over the load-transporting path, and means mounting the parts of each of the steps for movement relative to each other in said horizontal direction.

39. In a moving stairway, a plurality of steps, means mounting the steps for movement in a closed circuit over a load-transporting path and a step-return path, each of said steps having a first part and a second part, the first part of a first step and the second part of a second step adjacent the first step being shaped to interlock against relative movement of such parts in a horizontal direction transverse to the direction of the load-transporting path during movement of such parts over the load-transporting path, and means mounting the parts of each of the steps for movement relative to each other in said horizontal direction, said mounting means for each of the steps including resilient means opposing movement of the associated parts in said horizontal direction from predetermined positions relative to each other.

40. A step for a moving stairway comprising a horizontal tread part and a front part including a step riser, said tread part having a plurality of spaced tread cleats extending from the front part toward the rear part of the step, said front part having a cylindrical surface extending downwardly from substantially the tops of the tread cleats, said surface having a horizontal axis displaced from said surface in the direction of the rear of the step, and a plurality of spaced vertically-extending riser cleats projecting in a forward direction from said surface, the upper ends of said riser cleats terminating adjacent a horizontal plane located substantially below the tops of said tread cleats, a separate one of said riser cleats being located between vertical planes passing through each adjacent pair of the tread cleats.

41. A step for a moving stairway comprising a horizontal tread part and a front part including a step riser, said tread part having a plurality of spaced tread cleats extending from the front part toward the rear part of the step, said front part having a cylindrical surface extending downwardly from substantially the tops of the tread cleates, said surface having a horizontal axis displaced from said surface in the direction of the rear of the step, and a plurality of spaced vertically-extending riser cleats projecting in a forward direction from said surface, the upper ends of said riser cleats terminating adjacent a horizontal plane located substantially below the tops of said tread cleats, a separate one of said riser cleats being located between vertical planes passing through each adjacent pair of the tread cleats, said tread cleats having portions projecting rearwardly from the remainder of the step to constitute a horizontally-disposed comb, said tread cleats and said riser cleats having equal dimensions in a direction parallel to said axis.

42. A moving stairway step comprising a first unitary member having a plurality of spaced tread cleats, a second unitary member having a plurality of spaced tread cleats aligned longitudinally with the cleats of the first member, and means detachably securing the two members to each other.

43. A moving stairway step comprising a first unitary member having a plurality of spaced tread cleats, a second unitary member having a plurality of spaced tread cleats aligned longitudinally with the cleats of the first member, and means detachably securing the two members to each other, said members being of different materials having different physical characteristics.

44. In a load conveying device, a load bearing member and a second member, means mounting said load bearing member for movement relative to said second member, one of said members having a plurality of spaced cleats extending in the direction of load bearing member movement, a comb plate, the teeth of said comb plate being disposed to intermesh with said cleats, and means mounting said comb plate on the other of said members for movement for a substantial distance in a direction lateral to the direction of said movement of said load conveying member.

45. In a load conveying device, a load bearing member and a second member, means mounting said load bearing member for movement relative to said second member, one of said members having a plurality of spaced cleats extending in the direction of load bearing member movement, a comb plate, the teeth of said comb plate being disposed to intermesh with said cleats, means detachably securing said comb plate to the other of said members, and resilient means biasing said comb plate to a predetermined position, said resilient means permitting limited movement of said comb plate relative to its associated member in a direction lateral to the direction of movement of said load conveying member.

46. A moving stairway step comprising a first unitary member having a plurality of spaced tread cleats, a second unitary member having a plurality of spaced tread cleats aligned longitudinally with the cleats of the first member, the tread cleats of each member extending entirely thereacross, and means detachably securing the two members to each other in abutting relationship effectively to form substantially continuous tread cleats for the entire overall length of said abutting first and second sections.

47. A moving stairway step comprising a first unitary member having a plurality of spaced tread cleats, a second unitary member having a plurality of spaced tread cleats aligned longitudinally with the cleats of the first member, and means detachably securing the two members to each other, each of the tread cleats of each of said members having an exposed external surface, said surfaces of the tread cleats of said first member markedly differing in appearance from said surfaces of the tread cleats of said second member.

48. A moving stairway step comprising a riser and a tread, said tread comprising a first unitary member disposed adjacent said riser and having a plurality of spaced tread cleats and a second unitary member spaced from said riser and having a plurality of spaced tread cleats longitudinally aligned with the tread cleats of the first member, and means detachably securing the two members to each other, the tread cleats of said first member being fabricated of metallic material, the tread cleats of said second member being fabricated of plastic material markedly differing in appearance from said metallic material.

49. A moving stairway step comprising a riser and a tread, said tread comprising a first unitary member disposed adjacent said riser and having a plurality of spaced tread cleats and a second unitary member spaced from said riser and having a plurality of spaced tread cleats longitudinally aligned with the cleats of the first member, and means detachably securing the two members to each other, the tread cleats of said first member being fabricated of aluminum, the tread cleats of said second member being fabricated of nylon and having an appearance markedly different from that of the tread cleats of said first member.

References Cited in the file of this patent

UNITED STATES PATENTS

| | | |
|---|---|---|
| 2,030,103 | Dunlop | Feb. 11, 1936 |
| 2,210,711 | Dunlop | Aug. 6, 1940 |
| 2,214,580 | Dunlop | Sept. 10, 1940 |
| 2,723,020 | Margles et al. | Nov. 8, 1955 |
| 2,813,613 | Margles | Nov. 19, 1957 |

FOREIGN PATENTS

| | | |
|---|---|---|
| 556,502 | France | Apr. 16, 1923 |